Patented Jan. 28, 1930

1,744,961

UNITED STATES PATENT OFFICE

WILLIAM J. HALE, OF MIDLAND, MICHIGAN, ASSIGNOR TO DOW CHEMICAL COMPANY, OF MIDLAND, MICHIGAN, A CORPORATION OF MICHIGAN

PROCESS OF MAKING DIPHENYLOXIDE AND THE LIKE

No Drawing.  Application filed August 28, 1926.  Serial No. 132,321.

This invention relates more particularly to the preparation of diphenyloxide and the like, and it is among the objects of the invention to provide improved procedure and conditions for obtaining practicable yields.

Prior efforts made to produce diphenyloxide (C. A. phenyl ether) by passing phenol vapors over thorium oxide or other catalysts at 400° to 500° C., introduced contamination due to pyrogenic products, such as diphenylen oxide and other compounds difficult of removal. Ullman & Sponagel (Annalen 360, 83) treated chlorobenzene with molten sodium phenate in an open vessel in the presence of copper bronze powder as a catalyst, but a process of this type involves the preparation of a dry salt of phenol and an apparatus equipped with mechanical mixing devices. A process capable of employing easily obtainable and cheap materials and capable of practicable yields is accordingly highly desirable.

To the accomplishment of the foregoing and related ends, the invention, then, consists in the features hereinafter fully described and particularly pointed out in the claims, the following description setting forth but one of various ways in which the principle of the invention may be employed.

In accordance with my invention, an alkali and water and a halogenated benzene are subjected to heat and pressure, preferably in a continuous system with provision of catalytic surfaces and under controlled conditions.

By heating a solution of caustic alkali and chlorobenzene, phenol and diphenyloxide can be obtained, but the latter tends to hydrolize to phenol, particularly at temperatures above 300° C., and a certain concentration of diphenyloxide will check further formation of diphenyloxide and direct the driving force of conversion toward phenol. And contrariwise a certain increased concentration of phenol will check further formation of phenol and direct the driving force to formation of diphenyloxide. My procedure provides for operation in a manner to hinder phenol production, and I employ much less alkali, i. e., even half as much as is required in phenol manufacture.

Caustic soda is ordinarily preferable as the alkali, but hydroxides of any of the alkali metals or alkaline earth metals can be used with proportionate advantage.

The reaction components may be heated up together, but I prefer to feed them separately to the reaction vessel, and heat one or more of the conduits through which they are supplied, the temperature desired for reaction being directly available on admixture of the components. The reaction vessel may be of iron, but preferably it is of copper or provided with extensive surfaces of copper, such as to afford the maximum catalytic action.

As an illustrative example of my process, the following may be noted: Chlorobenzene and a five to fifteen percent solution of caustic soda in proportion of about one molecule of the chlorobenzene to one molecule of caustic soda are brought together through separate conduits to a reaction vessel. One or both of the conduits are heated so as to provide the reaction temperature of 275° to 375° C., preferably about 300° C., and it is desirable that the conduit for the caustic soda solution be of copper or lined with copper or with nickel. Extensive catalytic surfaces of copper favor the reaction such that it occurs quickly, and the products are then discharged together through a pressure-release device, or the aqueous layer containing the diphenyloxide may be selectively separated off if desired.

Other modes of applying the principle of my invention may be employed, change being made as respects the details disclosed, provided the steps stated by any of the following claims, or the equivalent of such stated steps, be employed.

I therefore particularly point out and distinctly claim as my invention:—

1. A process of making diphenyloxide, which includes reacting, at a temperature between 275° and 375° C., a halogenated benzene with an alkaline agent in aqueous medium, while in the presence of copper, the alkaline agent and halogenated benzene being employed in approximately equimolecular proportion.

2. A process of making diphenyloxide, which includes reacting, at a temperature between 275° and 375° C., a halogenated benzene with an aqueous solution of caustic soda in approximately equimolecular proportion, while in the presence of copper.

3. A process of making diphenyloxide, which includes reacting, at a temperature between 275° and 375° C., chlorobenzene with an aqueous solution of caustic soda in approximately equimolecular proportion, while in the presence of copper.

4. A process of making diphenyloxide, which includes reacting, at a temperature between 275° and 375° C., chlorobenzene and an aqueous solution of caustic soda in approximately equimolecular proportion.

5. A process of making diphenyloxide, which includes reacting, at a temperature between 275° and 375° C., a halogenated benzene and an aqueous solution of caustic soda in approximately equimolecular proportion.

6. A process of making diphenyloxide, which includes reacting, at a temperature between 275° and 375° C., a halogenated benzene with an alkaline agent in aqueous medium, the alkaline agent and halogenated benzene being employed in approximately equimolecular proportion.

Signed by me this 20th day of August, 1926.

WILLIAM J. HALE.